United States Patent
Bouknight, Jr. et al.

(10) Patent No.: US 8,700,831 B2
(45) Date of Patent: Apr. 15, 2014

(54) AUTOMATED CLASSIFICATION OF COMPUTER CONFIGURATION USING RULE SET

(75) Inventors: Wendell J. Bouknight, Jr., Clayton, NC (US); Andrew J. Ivory, Wake Forest, NC (US); Zackary A. James, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1451 days.

(21) Appl. No.: 12/013,781

(22) Filed: Jan. 14, 2008

(65) Prior Publication Data

US 2009/0182902 A1 Jul. 16, 2009

(51) Int. Cl.
*G06F 15/177* (2006.01)
*G06F 17/00* (2006.01)

(52) U.S. Cl.
USPC ............... 710/104; 710/8; 710/10; 710/19; 713/1; 713/100; 707/694

(58) Field of Classification Search
None
See application file for complete search history.

(56) References Cited

U.S. PATENT DOCUMENTS

| | | | |
|---|---|---|---|
| 6,950,931 B2* | 9/2005 | Wedlake | 713/2 |
| 7,580,991 B2* | 8/2009 | Scheer et al. | 709/220 |
| 2003/0200286 A1* | 10/2003 | Barfurth et al. | 709/220 |
| 2007/0112831 A1* | 5/2007 | Sarwono et al. | 707/102 |
| 2009/0182902 A1* | 7/2009 | Bouknight et al. | 710/10 |
| 2009/0299882 A1* | 12/2009 | Erickson et al. | 705/28 |

* cited by examiner

*Primary Examiner* — Tanh Nguyen
(74) *Attorney, Agent, or Firm* — Steven M. Greenberg, Esq.; CRGO Law

(57) ABSTRACT

A method, computer system and computer program product for generating a configuration status of a computer is provided. A method for generating a configuration status of a computer includes reading a plurality of configuration items of the computer and executing a plurality of rules upon the configuration items that were read, wherein each rule comprises an if-portion including at least one configuration item and a then-portion including an action for storing a configuration status value if the at least one configuration item of the if-portion matches the configuration items that were read. The method can further includes executing an algorithm that reads each of the configuration status values that were stored responsive to executing the plurality of rules and processes the configuration status values so as to produce a final configuration status of the computer and storing a record indicating the final configuration status of the computer.

17 Claims, 2 Drawing Sheets

AUTOMATED CLASSIFICATION OF COMPUTER CONFIGURATION USING RULE SET

BACKGROUND OF THE INVENTION

1. Field of the Invention

The present invention relates to computer configurations, and more particularly to automated processes for classifying a computer's configuration.

2. Description of the Related Art

The current configuration status of a computer or server provides a singular classification for a current status of the machine. Various types of configurations can be reported, such as the current security level of the computer or server or a current performance level of the computer or server. Administrators often need to classify the state of the configuration into a handful of categories or classifications for reasons of simplicity and expediency. For example, a web site administrator must be able to quickly ascertain a server's configuration status at a glance, so as to determine if the server is running in "high-traffic" mode—one example of a performance level configuration status.

Unfortunately, conventional logic for classifying large or entire portions of a computer or server's configuration status is typically hard-coded and requires constant maintenance in order to add/remove/update the various pieces that result in the final categorization or classification. These complex pieces of software are also constantly expanding, resulting in new functions and additional configuration information that must be part of any categorization. This is problematic for affiliated software development teams that need to provide an automated configuration status classification function because it requires additional time to tie in the conventional logic. Further, the conventional logic may not be built upon a well-defined and/or well-organized structure, thereby leading to runtime errors. Additionally, an affiliated software development team must fully understand the algorithms behind the categorization process, thereby increasing development time and resources.

Therefore, there is a need to improve the processes of the prior art and more particularly for a more efficient way for automatic classification of the configuration status of a computer or server.

BRIEF SUMMARY OF THE INVENTION

Embodiments of the present invention address deficiencies of the art and provide a novel and non-obvious method, computer system and computer program product for generating a configuration status of a computer. In one embodiment of the invention, a method for generating a configuration status of a computer includes reading a plurality of configuration items of the computer and executing a plurality of rules upon the configuration items that were read, wherein each rule comprises an if-portion including at least one configuration item and a then-portion including an action for storing a configuration status value if the at least one configuration item of the if-portion matches the configuration items that were read. The method can further includes executing an algorithm that reads each of the configuration status values that were stored responsive to executing the plurality of rules and processes the configuration status values so as to produce a final configuration status of the computer and storing a record indicating the final configuration status of the computer.

In another embodiment of the invention, a computer program product comprising a computer usable medium embodying computer usable program code for generating a configuration status of a computer can include computer usable program code for reading a plurality of configuration items of the computer and computer usable program code for executing a plurality of rules upon the configuration items that were read, wherein each rule comprises an if-portion including at least one configuration item and a then-portion including an action for storing a configuration status value if the at least one configuration item of the if-portion matches the configuration items that were read. The computer program product can further includes computer usable program code for executing an algorithm that reads each of the configuration status values that were stored responsive to executing the plurality of rules and processes the configuration status values so as to produce a final configuration status of the computer and computer usable program code for storing a record indicating the final configuration status of the computer.

In yet another embodiment of the invention, computer system for generating a configuration status of the computer system can be provided. The computer system can include a memory for storing a plurality of configuration items of the computer system and a plurality of rules for execution upon the configuration items of the computer system, wherein each rule comprises an if-portion including at least one configuration item and a then-portion including an action for storing a configuration status value if the at least one configuration item of the if-portion matches the configuration items of the computer system. The computer system can further include a processor configured for executing the plurality of rules upon the configuration items of the computer system, executing an algorithm that reads each of the configuration status values that were stored responsive to executing the plurality of rules and processes the configuration status values so as to produce a final configuration status of the computer system and storing a record indicating the final configuration status of the computer system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
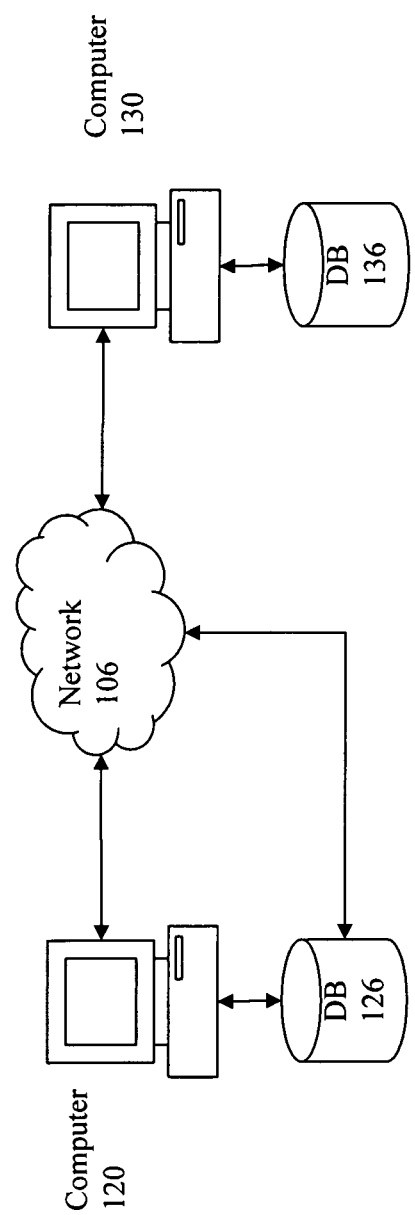
FIG. 1 is a block diagram illustrating the architecture of the components of an automated configuration status classification system, in accordance with one embodiment of the present invention.

FIG. 1 is a block diagram illustrating the architecture of the components of an automated configuration status classification system, in accordance with one embodiment of the present invention. The present invention provides a system whereby computer 120 automatically classifies the configuration status of itself—computer 120. In another embodiment of the present invention, the computer 120 automatically classifies the configuration status of another computer 130 wherein computer 120 and computer 130 are connected via a network 106, such as a Local Area Network (LAN) or a packet switched network such as the world wide web. The computers 120 and 130 each may comprise one or more personal computers, workstations or servers.

FIG. 1 also shows that computer 120 is connected to a database 126 that acts as a repository for data such as configuration items of the computer 120 and rules for execution the configuration items, wherein each rule comprises an if-portion including at least one model configuration item and a then-portion including an action for storing a configuration status value if the at least one model configuration item of the if-portion matches the configuration items of the computer 120. The nature of the data stored in database 126 is discussed in greater detail below with reference to FIG. 2. In another embodiment of the present invention, the database 126 may be accessed by the computer 120 over the network 106. In yet another embodiment of the present invention, some or all of the data accessed by computer 120 may be located on a remote database such as database 136 connected to computer 130.

A configuration item refers to one of possibly many configuration settings of a computer or server that together comprise a configuration status. A configuration status comprises a configuration status name and a configuration status value, which provides a single classification or category that describes the configuration status of a computer or server. An example of a configuration status name is "security level" and an example of related configuration status values are "high," "medium" or "low." Another example of a configuration status name is "performance level" (which relates to a data exchange rate) and an example of related configuration status values are "fast," "medium" or "slow." Yet, another example of a configuration status name is "configuration difficulty" (which relates to the complexity of a configuration setup) and an example of related configuration status values are "basic," "intermediate" or "advanced."

A configuration item comprises a configuration attribute and a related value. An example of a configuration attribute is "static routing" and an example of a related value is "enabled." Static routing refers to a manual method that is used to set up routing between networks. The network administrator configures static routes in a router by entering routes directly into the routing table of a router. When a static routing is implemented, the value of the configuration attribute is set to "enabled." Otherwise, the value of the configuration attribute is set to "disabled."

Additional examples of configuration attributes include local scripting administration, remote scripting administration, remote GUI administration and disk cache. The related value for each of the aforementioned configuration attributes can be "enabled" or disabled."

Figure 2:
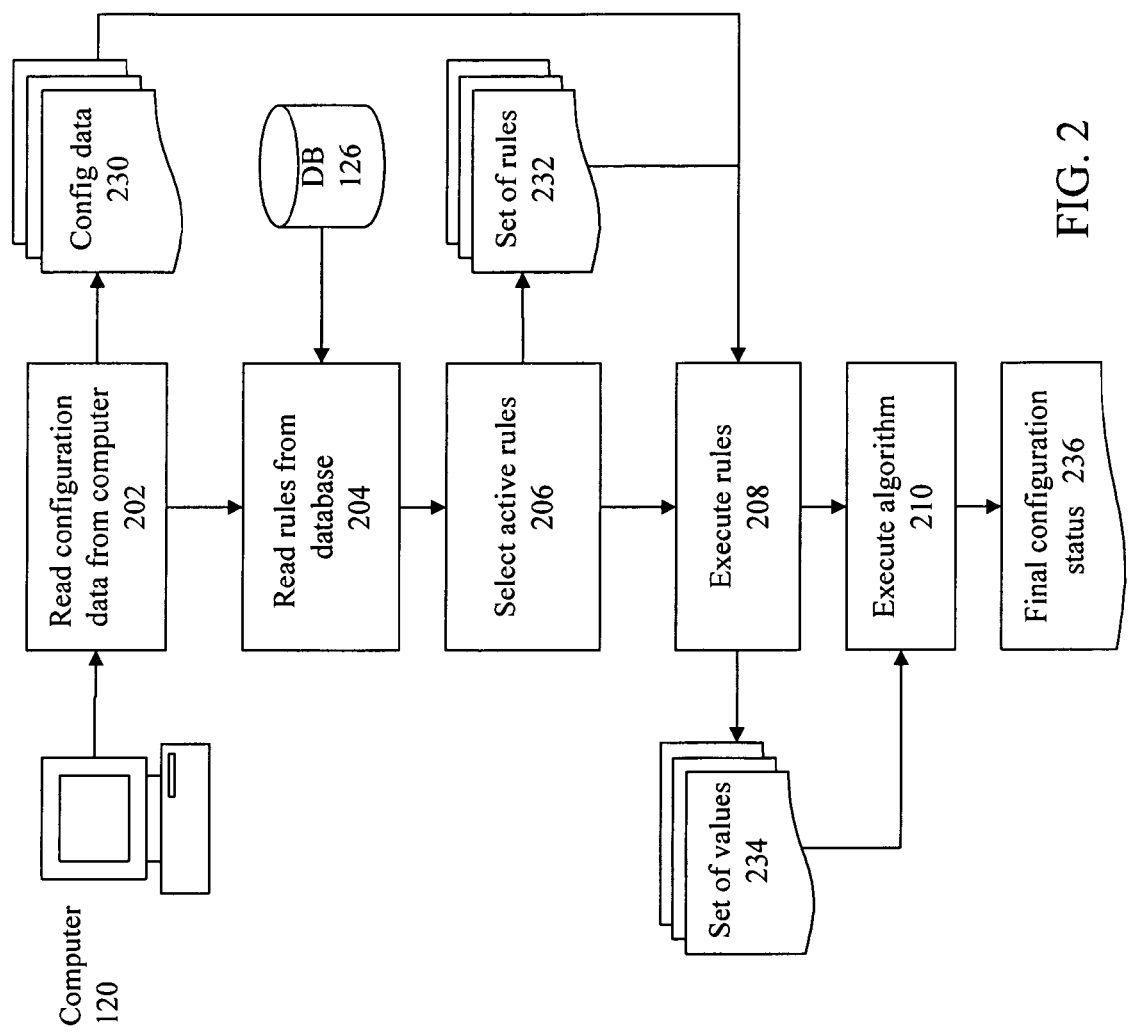
FIG. 2 is a flow chart illustrating the control flow of an automated configuration status classification process, in accordance with one embodiment of the present invention.

FIG. 2 is a flow chart illustrating the control flow of an automated configuration status classification process, in accordance with one embodiment of the present invention. The embodiment discussed in FIG. 2 refers to an embodiment where whereby computer 120 automatically classifies the configuration status of itself computer 120. Further in this embodiment, the computer 120 accesses database 126 to access configuration items of the computer 120 and rules for execution. It should be noted, however, that the present invention supports an implementation wherein the computer 120 automatically classifies the configuration status of computer 130 over network 106. Further in this embodiment, the computer 120 accesses database 136 to access configuration items of the computer 130 and rules for execution.

In step 202, the computer 120 accesses database 126 to access configuration items of the computer 120, wherein a configuration item comprises a configuration attribute and a related value, as described above, and a configuration item refers to one of multiple configuration settings of computer 120 that together comprise a complete configuration status. Computer 120 stores the read configuration items into a data set referred to as configuration data 230. In step 204, the computer 120 reads a set of rules from database 126.

A rule comprises: 1) an activity indicator that is set to either "active" or "inactive," 2) a list of one or more model configuration items and 3) a configuration status. A rule is executed upon configuration items read from computer 120. In short, if an active rule is executed, and the model configuration items of the rule match the configurations items of computer 120, then the configuration status of the rule is stored.

As an example, consider the rules, "if static routing is enabled, then security level is low" and "if static routing is disabled, then security level is high." In the first rule, the configuration item attribute is "static routing," the related value is "enabled," the configuration status name is "security level" and the related value is "low." In the second rule, the configuration item attribute is "static routing," the related value is "disabled," the configuration status name is "security level" and the related value is "high." Therefore, if the first and second rules were executed against the following configuration item of computer 120—"static routing" and "disabled"—then the following configuration status would be stored: "security level" and "high."

Additional examples of rules include "if local scripting administration is enabled, then security level is high, "if remote scripting administration is enabled, then security level is medium," "if remote GUI administration is enabled, then security level is low," and "if disk cache is enabled, then cache performance is slow."

In an embodiment of the present invention, rules can be generated by a user in textual format, wherein a user enters text into a client application such as a word processor or a web browser. Alternatively, rules can be generated by a user interacting with an interface providing selections to the user such as buttons, drop down menus and other graphical user interface widgets.

A configuration attribute value may be specified in a positive manner, wherein the existence of the specified configuration attribute value produces a match. For example, a statement that specifies a "model number=550" would produce a match against a model number of 550. Alternatively, a configuration attribute value may be specified in a negative manner, wherein the lack of the specified configuration attribute value produces a match. For example, a statement that specifies a "model number=NOT 550" would produce a match against a model number of 770. Further, configuration attribute values may be specified in a range such that any configuration attribute value that falls within that range produces a match. For example, a statement that specifies a "500<model number<700" would produce a match against a model number of 600. Additionally, configuration attribute values may be specified using a wildcard. For example, a statement that specifies a "model number=6**" would produce a match against a model number 655.

In step 206, the computer 120 selects those rules with activity indicators set to "active." Computer 120 stores the selected rules into a rule set referred to as rule set 232. In step 208, the rule set 232 is executed upon the configuration items stored in the data set referred to as configuration data 230. See above for a more detailed description of how a rule is executed upon stored configuration items. The result of the execution of rule set 232 is the storage of configuration statuses defined in the executed rules. The configuration statuses stored according to the execution of rule set 232 are stored in a data set referred to as data set 234.

In step 210, one or more algorithms are executed upon the data set 234, which contains one or more configuration statuses, wherein a configuration status comprises a configuration status name and a configuration status value, which provides a single classification or category that describes the configuration status of a computer or server. The algorithm takes as an input the configuration statuses of data set 234 and outputs a single configuration status. In one embodiment of the present invention, the algorithm sums all configuration status values and outputs the average of all configuration status values. In another embodiment of the present invention, the algorithm reads all configuration status values and outputs the highest of all configuration status values. In another embodiment of the present invention, the algorithm reads all configuration status values and outputs the lowest of all configuration status values. The result of step 210 is the output of the algorithm, which is a final configuration status.

The present invention provides advantages over the prior art as the use of simplified textual rules allow for the rapid and easy definition of rules for execution by the present invention. This allows an administrator to quickly change the method by which the final configuration status of the computer 120 is determined. Furthermore, the present invention includes the use of an activity indicator that defines whether a rule shall be executed. This provides additional versatility to an administrator as it allows him or her to quickly turn rules on or off so as to easily modify the method by which the final configuration status of the computer 120 is determined with little effort.

The present invention further provides advantages over the prior art as the present invention allows for the aggregation of large amounts of configuration data of a computer or server. This allows an administrator to quickly consider large amounts of data before a final configuration status is computed. Further, the use of an algorithm that aggregates the results of the execution of multiple rules allows for versatility in the method by which the final configuration status of the computer 120 is determined.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, and the like. Furthermore, the present invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code (such as described for computer 120) will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for generating a configuration status of a computer, comprising:
    reading a plurality of configuration items of the computer, each configuration item including a configuration item attribute and a value;
    executing a plurality of rules upon the configuration items that were read, wherein each rule comprises an if-portion including at least one configuration item and a then-portion including a configuration status, each configuration status including a configuration status name and a configuration status value;
    for each rule, storing the configuration status included in the then-portion if the at least one configuration item of the if-portion matches at least one configuration item of the configuration items that were read;
    executing an algorithm that reads each of the configuration statuses that were stored as a result of matching responsive to executing the plurality of rules and processes the configuration statuses so as to produce a singular final configuration status value of the computer for each configuration status name; and
    storing the singular final configuration status values corresponding to the configuration status names as a final configuration status of the computer.

2. The method of claim 1, further comprising:
    displaying the final configuration status of the computer.

3. The method of claim 2, wherein each of the plurality of rules being executed includes an activity indicator set to active.

4. The method of claim 1, wherein the step of executing an algorithm further comprises:
    executing an algorithm that reads each of the configuration status values for a particular configuration status name that were stored responsive to executing the plurality of rules and selects a configuration status value with a lowest value as a final configuration status of the computer for the particular configuration status name.

5. The method of claim 1, wherein the step of executing an algorithm further comprises:
    executing an algorithm that reads each of the configuration status values for a particular configuration status name that were stored responsive to executing the plurality of rules and computes an average configuration status value as a final configuration status of the computer for the particular configuration status name.

6. A computer program product comprising a computer usable storage medium, which is not a signal, storing computer usable program code for generating a configuration status of a computer, comprising:
   computer usable program code for reading a plurality of configuration items of the computer, each configuration item including a configuration item attribute and a value;
   computer usable program code for executing a plurality of rules upon the configuration items that were read, wherein each rule comprises an if-portion including at least one configuration item and a then-portion including a configuration status, each configuration status including a configuration status name and a configuration status value;
   computer usable program code for, for each rule, storing the configuration status included in the then-portion if at least one configuration item of the if-portion matches at least one configuration item of the configuration items that were read;
   computer usable program code for executing an algorithm that reads each of the configuration statuses that were stored as a result of matching responsive to executing the plurality of rules and processes the configuration statuses so as to produce a singular final configuration status value of the computer for each configuration status name; and
   computer usable program code for storing the singular final configuration status values corresponding to the configuration status names as a final configuration status of the computer.

7. The computer program product of claim 6, further comprising:
   computer usable program code for displaying the final configuration status of the computer.

8. The computer program product of claim 7, wherein each of the plurality of rules being executed includes an activity indicator set to active.

9. The computer program product of claim 6, wherein the computer usable program code for executing an algorithm further comprises:
   computer usable program code for executing an algorithm that reads each of the configuration status values for a particular configuration status name that were stored responsive to executing the plurality of rules and selects a configuration status value with a lowest value as a final configuration status of the computer for the particular configuration status name.

10. The computer program product of claim 6, wherein the computer usable program code for executing an algorithm further comprises:
   computer usable program code for executing an algorithm that reads each of the configuration status values for a particular configuration status name that were stored responsive to executing the plurality of rules and computes an average configuration status value as a final configuration status of the computer for the particular configuration status name.

11. A computer system that generates a configuration status of the computer system, comprising:
   a memory for storing:
      a plurality of configuration items of the computer system, each configuration item including a configuration item attribute and a value; and
      a plurality of rules for execution upon the configuration items of the computer system, wherein each rule comprises an if-portion including at least one configuration item and a then-portion including a configuration status, each configuration status including a configuration status name and a configuration status value; and
   a processor configured for:
      executing the plurality of rules upon the configuration items of the computer system;
      for each rule, storing the configuration status included in the then-portion if at least one configuration item of the if-portion matches at least one configuration item of the configuration items that were read;
      executing an algorithm that reads each of the configuration statuses that were stored as a result of matching responsive to executing the plurality of rules and processes the configuration statuses so as to produce a singular final configuration status value of the computer for each configuration status name; and
      storing the singular final configuration status values corresponding to the configuration status names as a final configuration status of the computer system.

12. The computer system of claim 11, further comprising:
   a display for displaying the final configuration status of the computer system.

13. The computer system of claim 12, wherein each rule further comprises:
   an activity indicator, wherein if the activity indicator of a rule is set to active, the rule is executed during the step of executing the plurality of rules above and wherein if the activity indicator of a rule is set to inactive, the rule is not executed.

14. The computer system of claim 11, wherein the configuration status name includes one of security level, performance level and configuration difficulty, and the configuration status value includes one of low security, medium security, and high security corresponding to the security level, one of slow performance, medium performance, and fast performance corresponding to the performance level, and one of basic configuration difficulty, intermediate configuration difficulty and advanced configuration difficulty corresponding to the configuration difficulty.

15. The computer system of claim 14, wherein the algorithm comprises instructions for reading each of the configuration status values for a particular configuration status name that were stored responsive to executing the plurality of rules and selects a configuration status value with a lowest value as a final configuration status of the computer for the particular configuration status name.

16. The computer system of claim 14, wherein the algorithm comprises instructions for reading each of the configuration status values for a particular configuration status name that were stored responsive to executing the plurality of rules and selects a configuration status value with a highest value as a final configuration status of the computer for the particular configuration status name.

17. The computer system of claim 14, wherein wherein the algorithm comprises instructions for reading each of the configuration status values for a particular configuration status name that were stored responsive to executing the plurality of rules and computing an average configuration status value as a final configuration status of the computer for the particular configuration status name.

\* \* \* \* \*